United States Patent [19]

LeClair et al.

[11] Patent Number: 5,727,137
[45] Date of Patent: Mar. 10, 1998

[54] PRINTER DRIVER ARCHITECTURE FOR REDUCING BAND MEMORY

[75] Inventors: Gregory A. LeClair, San Jose, Calif.; Kazuo Nakamura, Shiojiri, Japan

[73] Assignee: Seiko Epson Corporation, Tokyo, Japan

[21] Appl. No.: 573,021

[22] Filed: Dec. 15, 1995

Related U.S. Application Data

[60] Provisional application No. 60/007,191 Nov. 1, 1995, and provisional application No. 60/007,183 Nov. 1, 1995.

[51] Int. Cl.$^6$ ................................................. G06A 15/00
[52] U.S. Cl. ......................................... 375/116; 395/109
[58] Field of Search ............................... 395/102, 101, 395/109, 116, 114–115, 507–510; 382/237, 305; 358/457, 460, 261.4, 444

[56] References Cited

U.S. PATENT DOCUMENTS

| | | | |
|---|---|---|---|
| 4,768,082 | 8/1988 | Hiratsuka et al. | 358/13 |
| 5,251,046 | 10/1993 | Kato et al. | 358/457 |
| 5,506,944 | 4/1996 | Gentile | 395/115 |

FOREIGN PATENT DOCUMENTS

| | | |
|---|---|---|
| 0 575 167 | 12/1993 | European Pat. Off. |
| 0 578 264 | 1/1994 | European Pat. Off. |
| 0 619 555 | 10/1994 | European Pat. Off. |
| 0665675 | 8/1995 | European Pat. Off. |
| 0665677 | 8/1995 | European Pat. Off. |

*Primary Examiner*—Arthur G. Evans
*Attorney, Agent, or Firm*—W. Glen Johnson

[57] ABSTRACT

A system renders a print image while enabling reduction of the size of band memory. The printer driver includes a rendering driver comprising a driver interface, a drawing engine, an image and color library, band buffers and a color converter. The driver interface receives image data and drawing commands and transmits them to the drawing engine. The drawing engine divides the page into a series of bands, applies each drawing command for a band and renders the portion of an object in the band to a temporary buffer. To render an object, the drawing engine applies enhancement functions such as color biasing, image resolution enhancements, inverse dot gain transforms, etc. on the object and then applies a dithering function to convert intended color or gray-scale values of objects in the band to bi-level planar pixel matrices. By applying the dithering function before storing each band in band buffer memory, the size of the requisite band buffer memory is significantly reduced. The drawing engine transfers the rendered object to a band buffer. The color converter converts the band color from a band buffer color format to a printer color format and then transmits the banded image to the spooler for printing.

36 Claims, 7 Drawing Sheets

PRINTER DRIVER ARCHITECTURE FOR REDUCING BAND MEMORY

REFERENCE TO PROVISIONAL APPLICATION

This application claims priority of provisional application entitled "Printer Driver Architecture for Reducing Band Memory," Ser. No. 60/007,191, filed on Nov. 1, 1995, by inventors Gregory A. LeClair and Kazuo Nakamura, and provisional application entitled "Printer Driver Architecture Using Varied Binarization," Ser. No. 60/007,183, filed on Nov. 1, 1995, by inventors Gregory A. LeClair and Kazuo Nakamura.

CROSS-REFERENCE TO RELATED APPLICATIONS

This application is related to co-pending applications, the first application entitled "System and Method Using a Split Printer Driver to Control a Computer Printer Device" filed on Oct. 31, 1995, Ser. No. 08/550,749, by inventors Gregory A. LeClair and Kazuo Nakamura; the second application entitled "Computer Calibration Of A Color Print Image Using Successive Refinement" filed on Oct. 31, 1995, Ser. No. 08/550,415, by inventor Gregory A. LeClair; and the third application entitled "System and Method for Using Varied Binarization Processing to Implement a Printer Driver Architecture" filed on this date herewith, assigned Ser. No. 08/573,019 by inventors Gregory LeClair and Kazuo Nakamura, which subject matters are hereby incorporated by reference. These related applications have been commonly assigned to Seiko-Epson Corporation of Japan.

BACKGROUND OF THE INVENTION

1. Field of the Invention

The present invention relates generally to printer driver architectures. In particular, the invention relates to a system and method for reducing band memory using a unique printer driver that processes print image information before storing the information in band memory.

2. Description of the Background Art

The application of personal computers for use in printed imaging has become widespread. When a computer user generates an image, such as an advertisement or poster, the user designs the elements of the image on a computer screen and then routes the image to a printer for image production. As computer technology has become more sophisticated, the demand for computer printers with higher resolution and greater color reproduction has also increased. Drawbacks encountered by these increased technological demands include the need for larger amounts of computer memory, longer processing times, impaired print job throughput and reduced computer system performance. For example, each page of high resolution, color image data typically requires as much as 130 MB of memory, and can take as long as thirty-five minutes to print. Thus, the implementation of printer driver architectures has become a significant consideration in achieving optimal computer system performance.

To render a high resolution image having significant color content, computer systems conventionally use a printer driver software program (i.e. "printer driver") that divides a page into increments called "bands." Bands specify a horizontal strip of a page to be printed. The number of bands depends on the size of the image and the memory constraints of the computer system. To render an object within each band, the printer driver performs a series of functions on the object including retrieving image data relating to the object from a host computer system, analyzing and processing the data, and rendering the data into picture elements. After the printer driver renders the data into picture elements, the printer driver sequentially transmits each object within the band to the printer for printing.

Another function performed by the conventional printer driver includes color conversion from a video-based RGB model to a printer-based CMY (or CMYK) model. According to the RGB model, all colors of visible light may be made by combining within a single pixel red, green and blue light of select intensifies. The ratios of red, green and blue light to each other determine the color of the pixel. On the other hand, printers generate color using the CMY model. According to the CMY model, all colors of light may be made by combining cyan, magenta and yellow. Cyan, magenta and yellow are the complements to red, green and blue, respectively, and are based on the rule that color is specified by what is removed or subtracted from white light. Printers use the CMY (or CMYK) model instead of the RGB model due to the subtractive qualities of ink from white paper. For example, cyan is considered to subtract red from white light, while in the RGB model cyan is considered the addition of blue and green. Similarly, yellow absorbs blue light, and is the combination of red and green. A surface coated with cyan and yellow ink absorbs red and blue, leaving only green to be reflected. Some printers use black (K) ink instead of combining cyan, magenta and yellow, and other printer may have a different number and color of primary printer inks. Therefore, printer drivers convert colors based on the characteristics of the attached printer.

Referring now to FIG. 1, a block diagram is shown illustrating a conventional printer driver 100 architecture. Conventional printer driver 100 includes a driver interface 110, a drawing engine 120, band buffers 130, an image and color library 140 and a color converter 150. Driver interface 110 receives image information from a host computer, and transmits it to a drawing engine 120. Drawing engine 120 gathers the image information, and draws each object within a specified band into band buffers 130 in a top-down iterative fashion. Drawing an object is implemented by generating and writing a pixel map of the objects within the band to be printed to each band buffer. Drawing engine 120 then transmits the banded image to an image and color library 140 which performs enhancement functions such as dithering, color biasing, image resolution, etc., on the banded objects. Since conventional printer driver 100 performs enhancement functions on the banded bitmap image, printer driver 100 cannot distinguish between actual image and empty white spaces, and therefore performs enhancement functions on the empty white spaces of the image. This is both inefficient in terms of time and computer resource management. Image and color library 140 then sends the image to the color converter 150 to convert the image color from the RGB model to the CMY (or CMYK) model, which in turn sends the image to the spooler for printing.

As the size and complexity of an image increases, the memory constraints of a computer system dictate that the number of bands must also increase. Increasing the number of bands makes large and complex print jobs manageable but also increases processing time. Therefore, minimizing the number of bands per image becomes a significant consideration for achieving improved system performance. Yet, memory needed for a small size (1/25) band is still on the order of several megabytes, and thus minimization becomes a difficult task. Therefore, a system and method are needed to reduce requisite band memory for printer driver systems while minimizing the number of bands per image.

SUMMARY OF THE INVENTION

The present invention overcomes the limitations and deficiencies of the prior art with a system and method for rendering an image based on a unique printer driver architecture. The system includes a central processing unit (CPU) that connects with a display device, and input device, a data storage device, a printer and memory. The memory advantageously stores program routines comprising a page driver, a journal file, a journal file processor, a rendering driver, and a driver settings file. The routines in the memory are used by the CPU to provide a system that renders a print image while minimizing the size of band memory.

The page driver receives, reformats and transmits image data and drawing commands to the journal file for storage. The journal file stores the image data and drawing commands used for rendering the image. The journal file processor gathers the image data and drawing commands from the journal file, and transmits the information to the rendering driver. The rendering driver renders the image using the image data, the drawing commands and driver settings contained in the driver settings file, and sends the rendered image to the spooler for printing.

The rendering driver comprises program subroutines including a driver interface, a drawing engine, an image and color library, band buffers and a color converter. The driver interface receives image data and drawing commands from the journal file and transmits them to the drawing engine. The drawing engine divides the page into a series of bands, and renders a drawing command corresponding to a designated band into a temporary buffer. To render the image, the drawing engine performs on an object within the band enhancement functions such as color biasing, image resolution enhancements, inverse dot gain transforms, etc. Performing enhancement functions on the objects themselves achieves optimal image resolution and improves computer processing performance by avoiding the performance of the enhancement functions on empty spaces. The drawing engine then applies a dithering function that converts absolute color or gray-scale values to bi-level planar pixel matrices. Use of this dithering function advantageously enables storage of the intended color or gray-scale values in significantly less band buffer memory space. The value for an intended color value is reduced from typically 24 bits per pixel (bpp) to 3 bpp, and the value for an intended gray-scale value is reduced from typically 8 bpp to 1 bpp. The drawing engine transfers the rendered band image from the temporary buffer to a band buffer, and signals the driver interface that it is ready to receive image data for the next band. The color converter converts the image color from a band buffer color model, such as RGB, to a printer ink color model, such as CMY (or CMYK), and then transmits the band to the spooler for printing. This process repeats until the image is fully rendered and converted.

The present invention also comprises a method for rendering a print image. The method starts by receiving a drawing command and designating in a top-down fashion a band of a page to render. The objects within the band are drawn into a temporary buffer, the color is adjusted, and an inverse dot gain transform is applied that reduces the printer dot size to avoid printer ink oversaturation. A dithering function is applied that converts absolute color and gray-scale values to bi-level planar pixel data that optically provide the intended color, thereby reducing the size of requisite band memory. The data is then transferred from the temporary buffer to a band buffer, and underlying dots are eliminated. The data is converted to a printer ink color model and sent to the spooler for printing.

DETAILED DESCRIPTION OF THE PREFERRED EMBODIMENT

Figure 1:
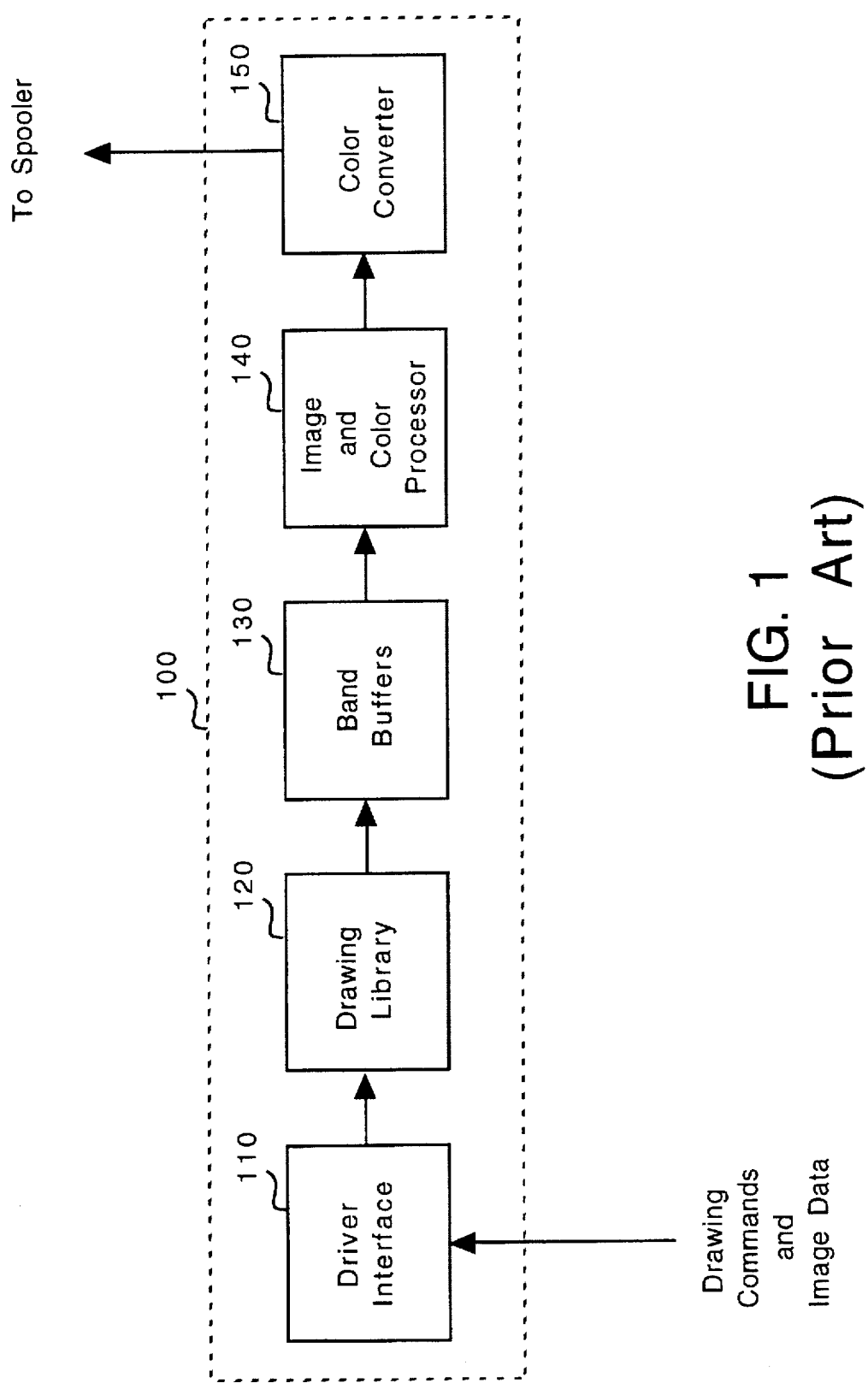
FIG. 1 is a block diagram illustrating a conventional printer driver architecture.
Figure 2:
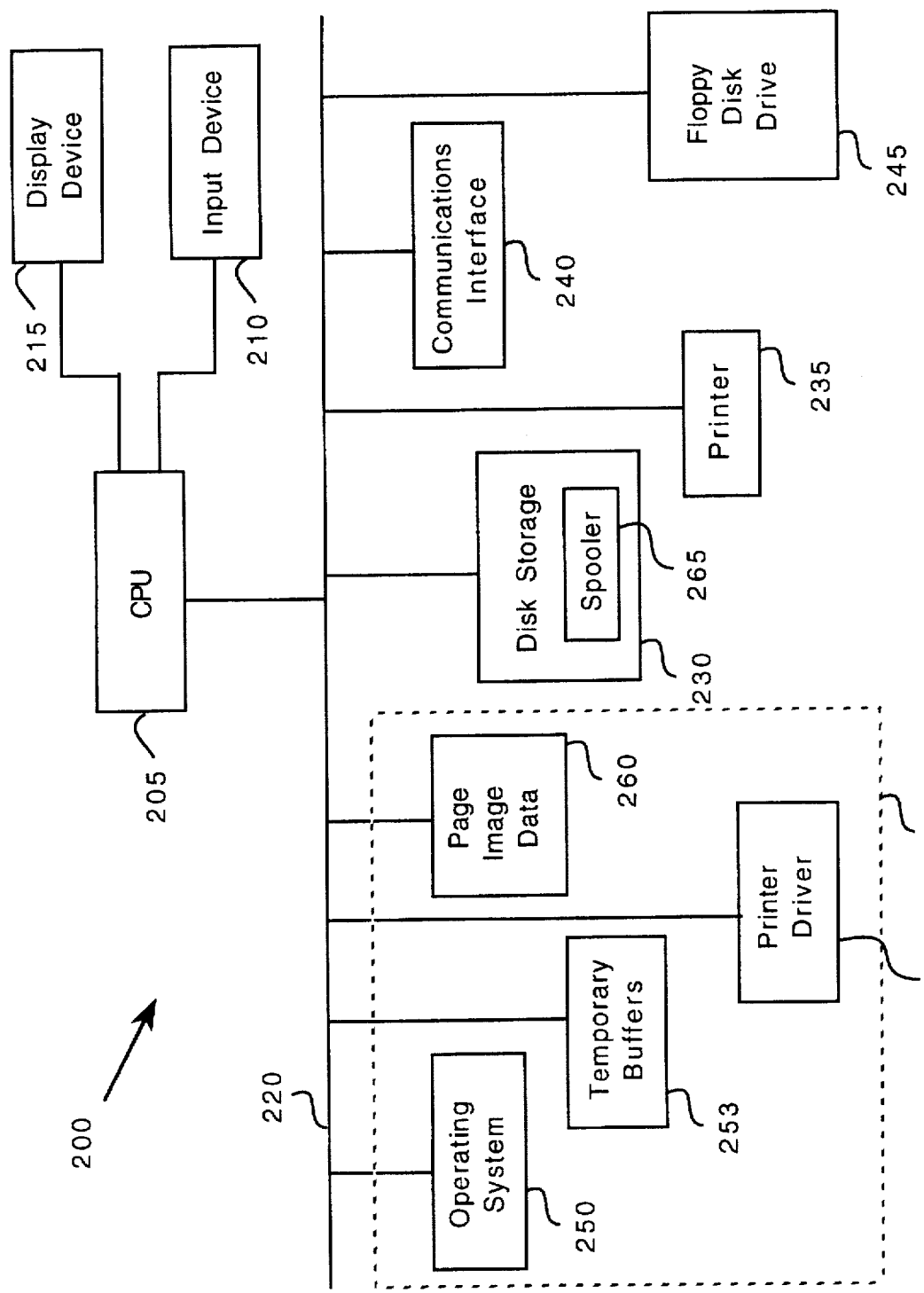
FIG. 2 is a block diagram of a computer system having a printer driver in accordance with the present invention.

Referring now to FIG. 2, a block diagram is shown of a computer system 200, preferably a personal computer such as the Pentium-based Epson Action Tower 8200 manufactured by Seiko-Epson Corporation of Japan. Computer system 200 includes a CPU 205. An input device 210, such as a keyboard and mouse, and an output device 215, such as a CRT, are coupled to CPU 205. Preferably, computer system 200 further comprises a block of conventional random access memory (RAM) 225, a disk storage 230, a printer 235, communications interface 240, and a floppy disk drive 245, each coupled to CPU 205 via a signal bus 220.

RAM 225 preferably stores an operating system 250, temporary buffers 253 for storing miscellaneous data, a printer driver 255, and page image data 260. Operating system 250 is a program which when executed by CPU 205 controls and facilitates the operation of CPU 205 on other stored program data. Printer driver 255 is a program which when executed by CPU 205 allows stored data to be formatted and printed fit printer 235. Page image data 260 is stored data waiting to be processed by printer driver 255 for printing at printer 235. Disk storage 230 includes a spooler 265 for storing documents processed by printer driver 255 and waiting to be printed at printer 235. Printer driver 255 may be initially stored in disk storage 230 and loaded into RAM 225 prior to execution by CPU 205. Floppy disk drive 245 enables storing printer driver 255 onto a removable storage medium.

Figure 3:
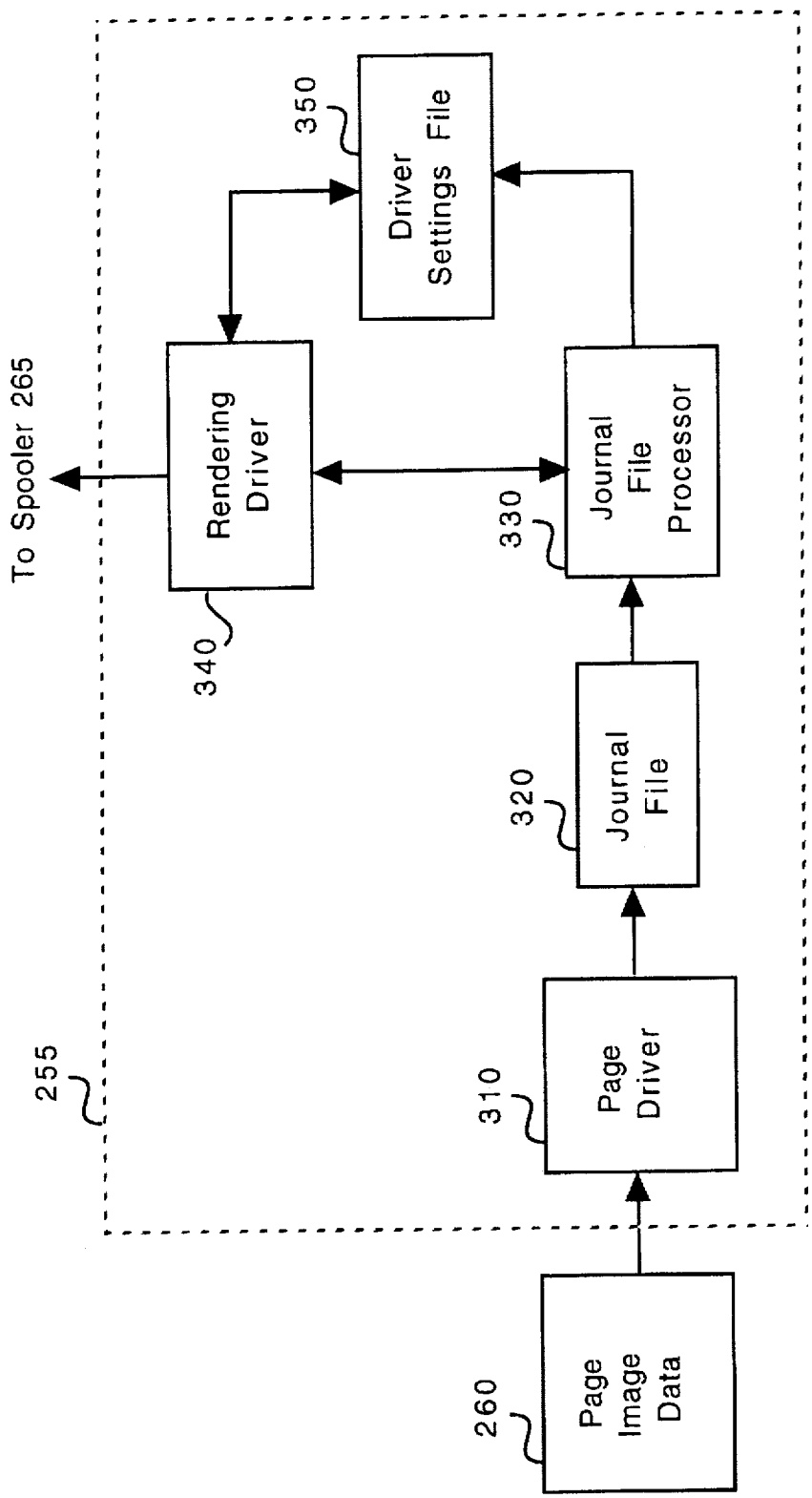
FIG. 3 is a block diagram of the printer driver of FIG. 2.

Referring now to FIG. 3, a block diagram illustrating printer driver 255 is shown. Printer driver 255 comprises several program routines including a page driver 310, a journal file 320, a journal file processor 330, a rendering driver 340 and a driver settings file 350. At the time of printing, page image data 260 is transmitted by CPU 205 along signal bus 220 to printer driver 255. Page image data 260 is received by page driver 310 as a conventional series of image portions, such as bands. These image portions are to be transferred to the print medium (such as paper) by printer 235. Page driver 310 collects the image portions, places the portions into a single page format that represents each page of an image, and then sends the formatted page to journal file 320. Journal file 320 is a collection of the formatted pages from page driver 310 and drawing commands needed to render a printed image from the data 260. These drawing commands include pointers to conventional program subroutines that specify text font, object color, object size, object alignment, fill patterns, etc. For example, a drawing command may be a command for printer 235 to draw a black square having certain dimensions, line thickness, etc. at a specific position on a page.

Journal file processor 330 receives formatted pages and all requisite drawing commands from journal file 320, and sends the information to rendering driver 340. Rendering driver 340 retrieves printer driver settings information from driver settings file 350. Driver settings file 350 contains printer driver settings such as image resolution, color information, printable area, and other printer options such as image quality (i.e. "draft," "normal," or "high-resolution"). Using the printer driver settings information, rendering driver 340 applies the drawing commands to page image data 260, in order to generate pixel data and thereby rendering the image. Rendering driver 340 then sends the rendered image to spooler 265 for printing at printer 235.

Figure 4:
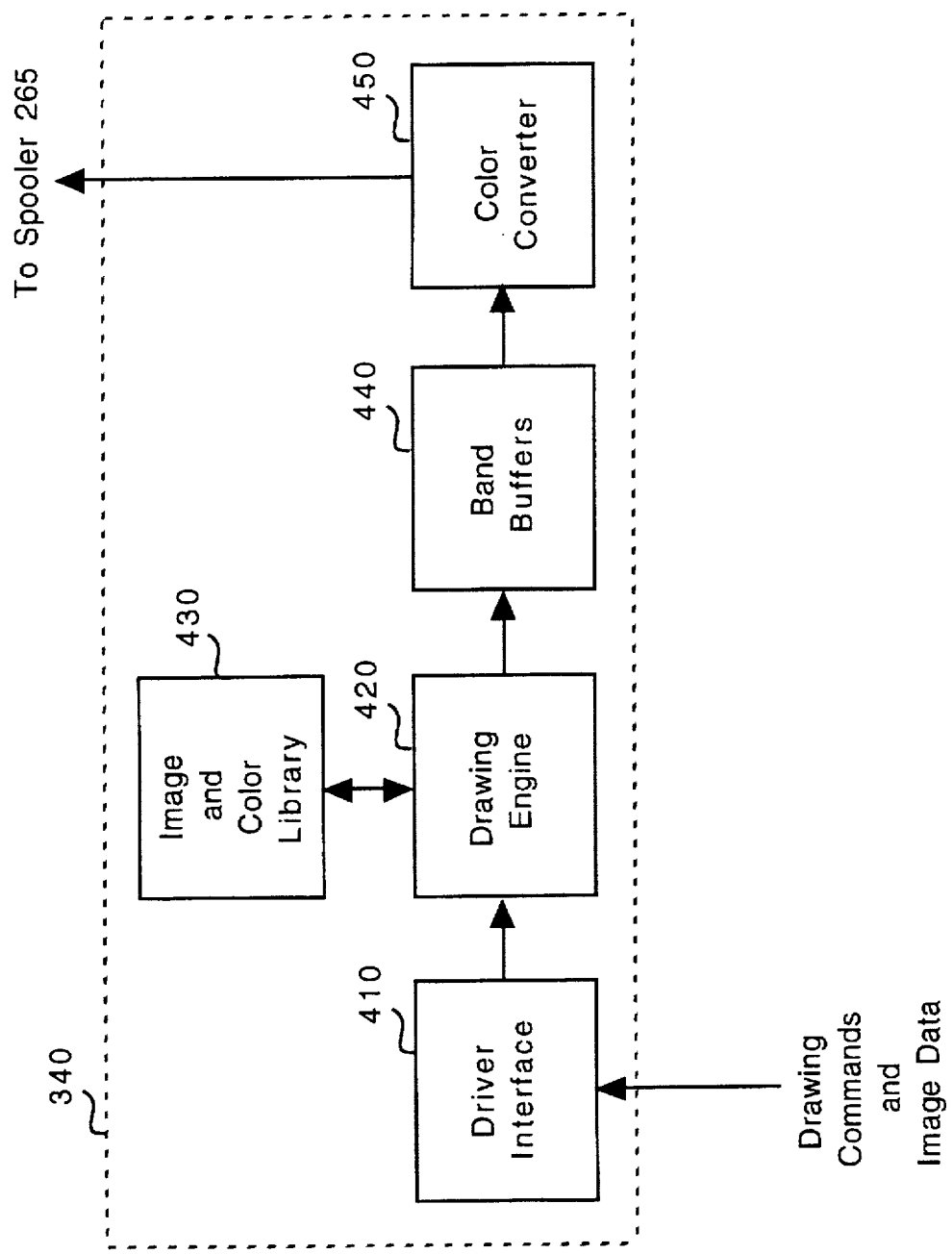
FIG. 4 is a block diagram illustrating the rendering driver of FIG. 3.

Referring now to FIG. 4, a block diagram illustrating rendering driver 340 of the present invention is shown. Rendering driver 340 comprises program subroutines including a driver interface 410, a drawing engine 420, an image and color processing library 430, band buffers 440 and a color converter 450. Driver interface 410 receives drawing commands and image data from journal file processor 330 (FIG. 3) and subsequently transfers the drawing commands and image data to drawing engine 420. Drawing engine 420 divides a page into a series of bands. In a top-down fashion, drawing engine 420 specifies a band, renders the drawing commands and image data that are positioned within that band and discards the remaining data. Drawing engine 420 then generates and writes a pixel map of (i.e. "renders") the object or portions of the object corresponding with the specified band to a temporary buffer 253.

Drawing engine 420 calls appropriate program code within image and color library 430 as specified by the driver settings contained in driver settings file 350 for controlling enhancement functions, such as image resolution, color biasing, saturation, contrast, inverse dot gain transforms, etc. Enhancement functions optimize image characteristics and minimize color loss due to dithering functions which are performed below. It will be appreciated that drawing engine 420 applies image and color enhancement operations on each object itself and not on the pixel map representing each band object. By operating only on the objects and not on the entire band pixel map, drawing engine 420 performance is advantageously improved. For example, a designer can select a first image resolution function for a picture object and a second function for a bar graph, rather than a conventional single image resolution function for the entire pixel map. It will be further appreciated that drawing engine 420 need not convert indexed color or gray scale values of an object to a uniform absolute color value before performing enhancement functions on an object. The program code enhancement functions contained in image and color library 430 can be performed on color and gray-scale objects using indexed color schemes including two bits per pixel (bpp), four bpp, eight bpp, or sixteen bpp.

Figure 5:
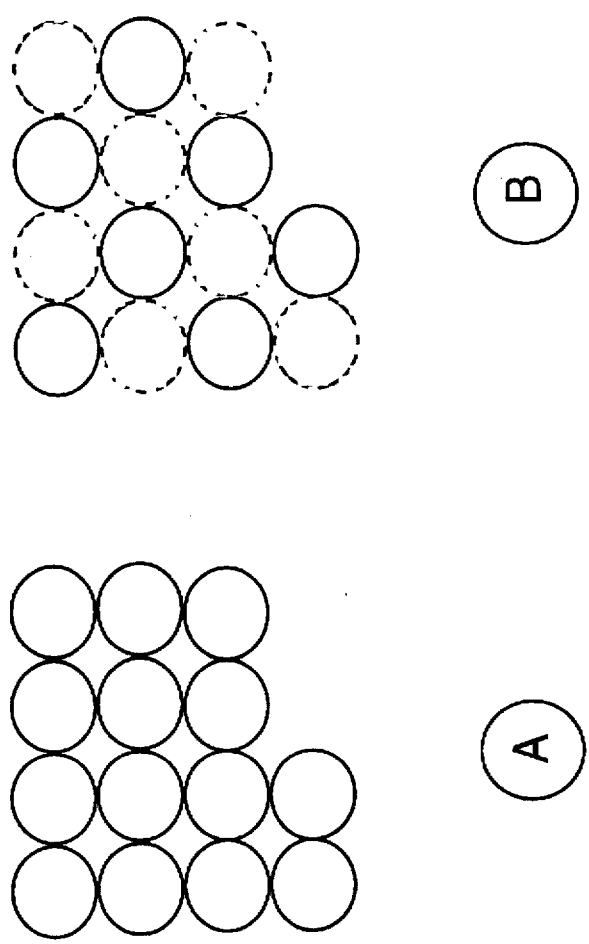
FIG. 5 illustrates dot density for an oversaturated region A and dot density for an acceptable region B.

Another enhancement function of drawing engine 420 includes adjusting for printer ink oversaturation. When a printer 235 generates ink dots for every pixel of data, printer 235 often oversaturates regions on the print medium (such as paper). In order to avoid ink oversaturation, drawing engine 420 can reduce the size or eliminate some of the dots in oversaturated regions. FIG. 5 illustrates dot density for an oversaturated region A and dot density for an acceptable region B, wherein the dot density has been adjusted by eliminating every other dot. Alternatively, drawing engine 420 can apply an inverse dot gain transform to reduce the size of the dots, thereby achieving optimal dot density. That is, based on a given resolution (i.e. 720 dots per inch), a dot has a certain theoretical size and an actual size. Actual dot size is typically larger than theoretical dot size due to variables, including temperature and variations in print medium characteristics such as texture, absorbency, grain direction, etc. The difference between actual and theoretical size is referred to as "dot gain." Drawing engine 420 applies the inverse dot gain transform by applying a negative coefficient to the intensity of the image, which effectively compensates an image to account for dot gain. Although applying an inverse dot gain transform generates a theoretically reduced intensity image, applying inverse dot gain minimizes the effects of the printer dot gain characteristics without appreciable color loss.

Eliminating or reducing the size of ink dots creates a potential problem with respect to overlapping objects. If an image includes a first object overlapped by a second object, some of the underlying first object may show through the overlapping second object. Unless this case is specifically defined, drawing engine 420 also collects position information on each object of the image, determines if any objects overlap and eliminates the underlying dots of the underlying object.

Drawing engine 420 then calls image and color library 430 program code to apply a dithering function that converts intended absolute pixel color or gray-scale values to bi-level planar pixel matrices which optically produce the intended colors. In this case, "bi-level" means having one of two possible states, either "on" or "off," and "planar" means "per each red, green and blue plane," although other band buffer color formats can alternatively be used. Drawing engine 420 analyzes the intended color to determine its level of red, green and blue, and thus creates a matrix of bi-level planar pixels which together produce the intended color, wherein each pixel comprises one of eight possible colors, each color comprising a predefined red (on or off), a predefined green (on or off) and a predefined blue (on or off). Applying the dithering functions before storage of the object in the band buffer memory enables the reduction of the requisite size of the band buffer memory. Typically, an absolute pixel value requires twenty-four bpp for color objects and eight bpp for gray-scale objects. By applying the dithering function, only three bpp is needed for color objects and one bpp is needed for gray-scale objects. Consequently, significantly less band buffer memory is required.

Drawing engine 420 generates a bi-level planar pixel matrix in the dithering function by using interpolation and error compensation from the corresponding absolute color or gray-scale value. For example, if an intended absolute color value specifies teal, drawing engine 420 generates a matrix of green and blue pixels that produce teal in color. That is, drawing engine 420 analyzes the absolute color value for teal to determine its level of red, green and blue, and thus creates a matrix of pixels which together appear teal. More particularly, drawing engine 420 specifies a first pixel and its closest RGB color (most likely blue) and generates an error coefficient to influence the adjacent second pixel color (most likely from a blue to a green). The process of generating error coefficients and influencing adjacent pixels continues until a matrix is produced that appears teal.

Drawing engine 420 then transfers the rendered data from temporary buffer 253 to a reduced-size band buffer 440, and signals driver interface 410 that it is ready to receive drawing commands and image data to prepare the next band. After the image is transferred to band buffer 440, the image is sent to color converter 450, which converts image color from the reduced band buffer color format, such as the RGB model, to a printer ink color format, such as a CMY or CMYK model, as specified by the driver settings contained in driver settings file 350. Color converter 450 then sends the image to spooler 265 for printing. The above process repeats until all bands of the image are rendered and printed.

Figure 6:
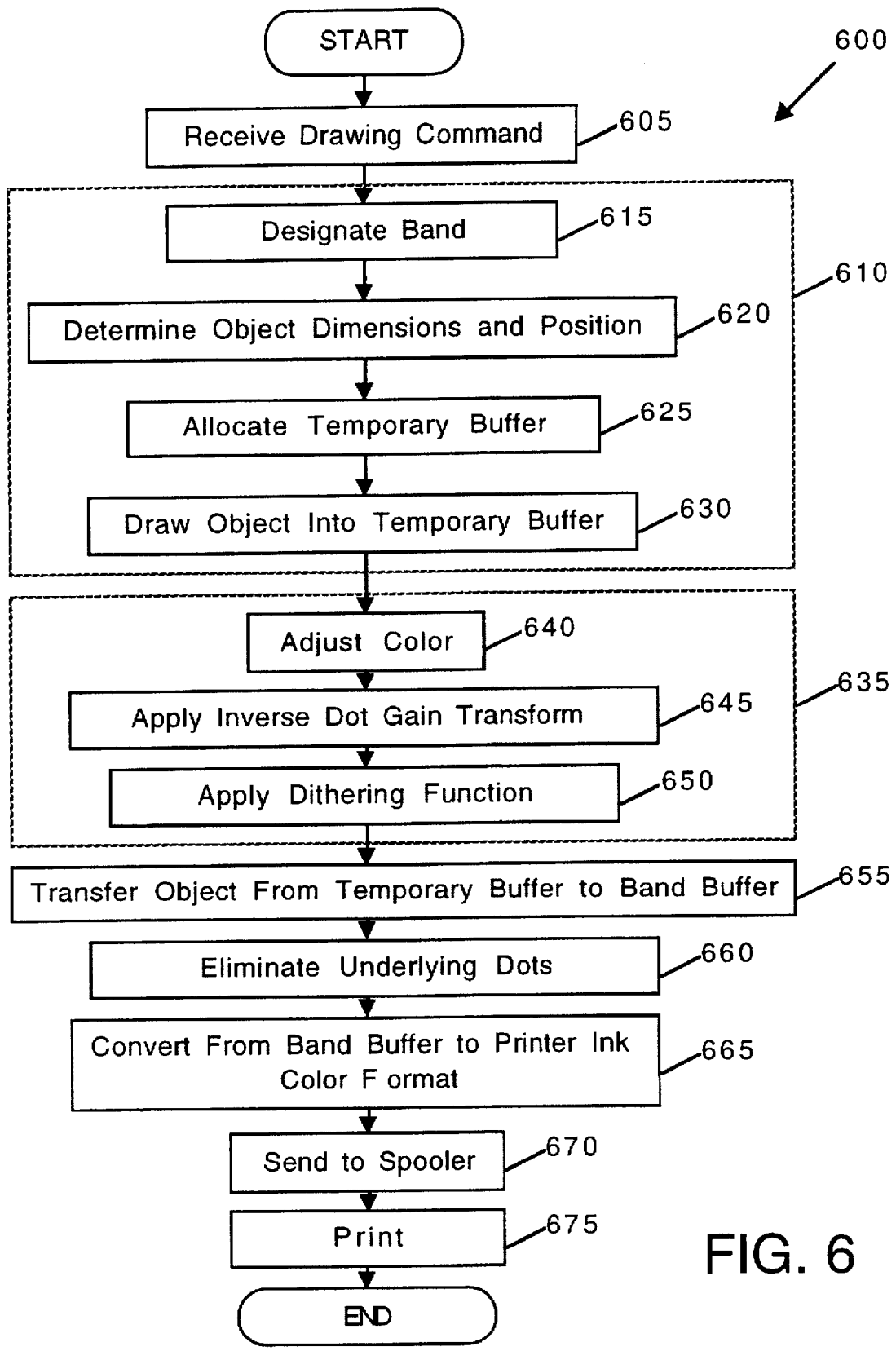
FIG. 6 is a flowchart illustrating the preferred method for rendering an image using the printer driver architecture of the present invention.

Referring now to FIG. 6, FIG. 6 depicts a flowchart illustrating a preferred method 600 for rendering an image using printer driver 255 of the present invention. Method 600 starts by receiving 605 a drawing command, such as a command to draw a teal box at the center of a page. Based on the drawing command, an object or portion of an object is rendered 610 by designating 615 a band of the page to draw, determining 620 object dimensions and object position, allocating 625 and drawing 630 to a temporary buffer 253 the object or portion of an object corresponding to the designated band.

After drawing 630 the object, image and color processing is applied 635 to the object. As described above with reference to FIG. 4, image and color processing comprises adjusting 640 the color, applying 645 an inverse dot gain transform to correct for pixel size dot gain and achieve optimal dot density when printed at printer 235, and applying 650 a dithering function that converts absolute color or gray-scale values to a bi-level planar pixel matrix. The dithering function enables conversion of object color values from twenty-four bpp to three bpp and object gray-scale values from eight bpp to one bpp, thereby enabling reduction of requisite band buffer memory.

The contents of temporary buffer 253 are then transferred 655 to a band buffer 440, and underlying dots are eliminated 660, if specified. After all objects corresponding to the currently designated band are transferred to band buffer 440, the image in band buffer 440 is converted 665 from the band buffer color model to the printer ink color model, sent 670 to spooler 265 and printed 675. Subsequently, method 600 ends.

Figure 7:
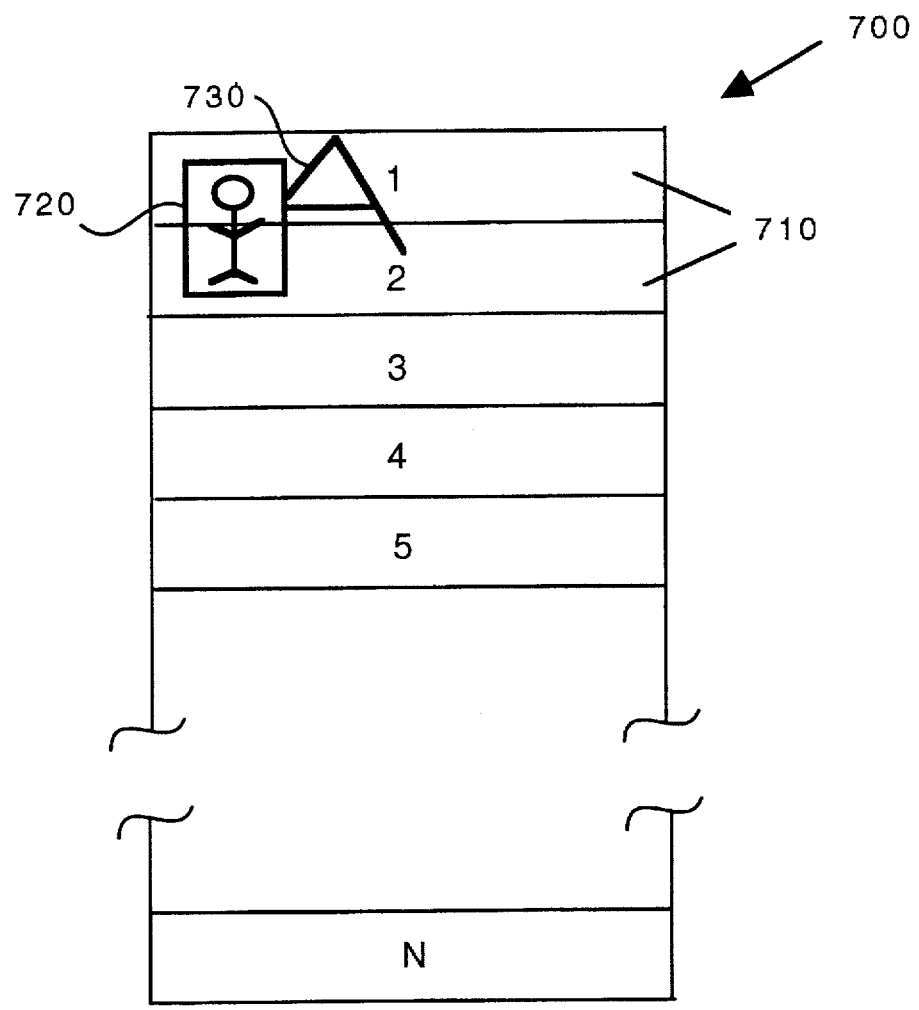
FIG. 7 illustrates an exemplary print image to be printed at the printer of FIG. 2.

Referring now to FIG. 7, an exemplary print image 700 is shown. Image 700 is positioned in the top left corner of the page and includes a stick figure in a box 720 overlapping a letter "A" 730. Driver interface 410 receives drawing commands and image data for print image 700 from journal file 320 and transmits the data to drawing engine 420. Drawing engine 420 divides the page into N bands 710, and renders the drawing command and image information positioned within band "1" into temporary buffer 253. Drawing engine 420 controls image and color processing for each object in temporary buffer 253 including performance of enhancement functions such as the application of the inverse dot gain transform, the examination of objects 720 and 730 and thus the elimination of the underlying dots of object 730. Drawing engine 420 then applies a dithering function that converts the color and gray-scale values of objects 720 and 730 to bi-level planar pixel matrices. Drawing engine 420 then transfers the image data from temporary buffer 253 to a reduced-size band buffer 440. Color converter 450 converts the image data to the CMY (or CMYK) color model, and transmits the image data to spooler 265 for printing.

The foregoing description of the preferred embodiments of the invention is only by way of example, and other variations of the above-described embodiments and methods are provided by the present invention. The preferred system embodied in the general purpose computer of FIG. 2 is equally effective if implemented as a component of a conventional processor-driven imaging device. For example, the printer driver 255 could be contained within a processor-driven printer 235, scanner, facsimile machine, document copier, or other related machine. It is well understood that these conventional processor-driven devices can be thought of as special purpose computers, each containing a CPU 220, an operating system 260, etc. Also, components of this invention may be implemented using a programmed general purpose digital computer, using application specific integrated circuits, using a network of interconnected conventional components and circuits or using a multithreaded multitasking environment. The embodiments described herein have been presented for purposes of illustration and are not intended to be exhaustive or limiting, and many variations and modifications are possible in light of the foregoing teaching. The system is limited only by the following claims.

What is claimed is:

1. A print image processing method, comprising the steps of:

receiving print image data corresponding to an image to be printed, the print image data including at least one print object;

extracting a band of the received print image data defining at least a portion of the print object;

storing the extracted band into a first memory, the extracted band having a first data size;

color processing the extracted band stored in the first memory;

dithering the color processed band;

storing the dithered band into a second memory, the dithered band having a second data size less than the first data size; and rendering the dithered band stored in the second memory to generate a printable bitmap thereof.

2. The method of claim 1, further comprising the steps of:

applying an inverse dot gain transform to the color processed band stored in the first memory to compensate for printer ink oversaturation; and eliminating overlapped dots present in the printable bitmap to compensate for subtractive artifacts therein introduced by said applying step.

3. The method of claim 1, wherein said dithering step comprises converting a real color value for at least one pixel defined in the color processed band into a corresponding bi-level planar matrix of values corresponding to a plurality of distinct color planes.

4. The method of claim 3, wherein the plurality of color planes include red, green and blue color planes.

5. The method of claim 1, wherein said color processing step comprises applying at least one of a color biasing function, a resolution function, a contrast function and a saturation function to the extracted band stored in the first memory.

6. A print driver, comprising:

a first memory containing print image data corresponding to an image to be printed, the print image data including at least one print object;

a drawing engine in communication with said first memory, comprising:

means for extracting a band of the print image data defining at least a portion of the print object;

means for storing the extracted band into a second memory, the extracted band having a first data size;

means for color processing the extracted band stored in the second memory;

means for dithering the color processed band; and means for storing the dithered band into a third memory, the dithered band having a data size substantially less than the data size of the extracted band; and a render driver in communication with said drawing engine for rendering the dithered band stored in the third memory to generate a printable bitmap thereof.

7. The method of claim 1, further comprising the steps of:

converting the printable bitmap to one of a CMY and CMYK color model; and transmitting the converted bitmap to a spooler for printing.

8. The print driver of claim 6, further comprising a color converter in communication with said third memory for converting the dithered print image data from an RGB color model to one of a CMY and a CMYK model.

9. The print driver of claim 6, further comprising a print spooler in communication with said drawing engine and third memory for spooling dithered print image data to a printer.

10. The print driver of claim 6, wherein said drawing engine further comprises means for applying an inverse dot gain transform to the color processed band to compensate for printer ink oversaturation.

11. The print driver of claim 10, further comprising means communicating with said third memory for eliminating overlapped dots present in the printable bitmap to compensate for subtractive artifacts introduced by said applying means.

12. A computer program product for use with an image recording system comprising an information processor in communication with a printer, the computer program product comprising:

a computer useable medium defining computer readable program code to receive print image data corresponding to an image to be printed on the printer of the image recording system, the print image data including at least one print object;

a computer useable medium defining computer readable program code to extract a band of the received print image data defining at least a portion of the print object;

a computer useable medium defining computer readable program code to store the extracted band into a first memory of the image recording system, the extracted band having a first data size;

a computer useable medium defining computer readable program code to color process the extracted band stored in the first memory;

a computer useable medium defining computer readable program code to dither the color processed band;

a computer useable medium defining computer readable program code to store the dithered band into a second memory of the image recording system, the dithered band having a second data size substantially less than the first data size; and a computer useable medium defining computer readable program code to render the dithered band stored in the second memory to generate a printable bitmap thereof.

13. The computer program product of claim 12, further comprising:

a computer useable medium defining computer readable program code to apply an inverse dot gain transform to the color processed band stored in the first memory to compensate for printer ink oversaturation; and a computer useable medium defining computer readable program code to eliminate overlapped dots present in the printable bitmap to compensate for subtractive artifacts present therein.

14. The computer program product of claim 12, wherein said computer useable medium defining computer readable program code to dither comprises computer readable program code to convert a real color value for at least one pixel defined in the color processed band into a corresponding bi-level planar matrix of values corresponding to a plurality of distinct color planes.

15. The computer program product of claim 14, wherein the plurality of color planes include red, green and blue color planes.

16. The computer program product of claim 12, wherein said computer useable medium defining computer readable program code to color process comprises computer readable program code to apply at least one of a color biasing function, a resolution function, a contrast function and a saturation function to the extracted band stored in the first memory of the image recording system.

17. The computer program product of claim 12, wherein the print image data is received from a journal file.

18. The computer program product of claim 12, wherein the print image data includes drawing commands.

19. The computer program product of claim 12, further comprising:

computer useable medium defining computer readable program code to convert the printable bitmap to one of a CMY and CMYK color model; and computer useable medium defining computer readable program code to transmit the converted bitmap to a spooler for printing.

20. An image processing system, comprising:

an information processor;

a first memory in communication with said information processor, said first memory containing print image data corresponding to an image to be printed, the print image data including at least one print object;

a second memory in communication with said information processor, comprising:

computer readable program code causing said information processor to extract a band of the print image data contained in said first memory, the extracted band defining at least a portion of the print object;

computer readable program code causing said information processor to store the extracted band into the second memory, the extracted band having a first data size;

computer readable program code causing said information processor to color process the extracted band stored in the second memory;

computer readable program code causing said information processor to dither the color processed band;

computer readable program code causing said information processor to store the dithered band into a third memory, the dithered band having a data size substantially less than the data size of the extracted band; and computer readable program code causing said information processor to render the dithered band stored in the third memory to generate a printable bitmap thereof.

21. The system of claim 20, wherein a data size of the color processed band is at least twenty-four bits per pixel; and wherein the computer readable program code for causing the information processor to dither comprises computer readable program code to convert the color processed band into the dithered band, the data size of the dithered band not exceeding three bits per pixel.

22. The system of claim 20, wherein said second memory further comprises computer readable program code causing the information processor to convert the dithered print image data from an RGB color model to one of a CMY and a CMYK model.

23. The system of claim 20, further comprising a print spooler in communication with said information processor and said third memory for spooling dithered print image data to a printer.

24. The system of claim 20, wherein said second memory further comprises computer readable program code causing said information processor to apply an inverse dot gain transform to the color processed band to compensate for printer ink oversaturation.

25. The system of claim 24, wherein said second memory further comprises computer readable program code causing said information processor to eliminate overlapped dots present in the printable bitmap to compensate for subtractive artifacts present therein.

26. The system of claim 19, wherein the color processed band of print image data further comprises intended color values specifying intended colors, and the computer readable program code causing said information processor to dither comprises computer readable program code to convert the intended color values to bi-level planar pixel matrices approximating the intended colors.

27. The system of claim 26, wherein the intended color values are real color values.

28. The system of claim 26, wherein the intended color values are indexed gray-scale values.

29. The print driver of claim 6, wherein the color processed band of print image data further comprises intended color values specifying intended colors, and the dithering means of said drawing engine converts the intended color values to bi-level planar pixel matrices approximating the intended colors.

30. The print driver of claim 29, wherein said third memory comprises a band buffer having a size; and the size of the band buffer is smaller than the size of said second memory storing the extracted band.

31. The print driver of claim 29, wherein the intended color values are real color values.

32. The print driver of claim 29, wherein the intended color values are indexed gray-scale values.

33. The method of claim 1, wherein the print image data is received from a journal file.

34. The method of claim 1, wherein the print image data includes drawing commands.

35. The method of claim 1, wherein the step of extracting a print image band is performed on the print image data in a top-down fashion.

36. The print driver of claim 31, wherein a data size of the color processed band is at least twenty-four bits per pixel; and wherein the dithering means of said drawing engine converts the color processed band into the dithered band, the data size of the dithered band not exceeding three bits per pixel.

* * * * *